US010581744B2

(12) United States Patent
Mehta et al.

(10) Patent No.: US 10,581,744 B2
(45) Date of Patent: Mar. 3, 2020

(54) GROUP-BASED PRUNING IN A SOFTWARE DEFINED NETWORKING ENVIRONMENT

(71) Applicant: Cisco Technology, Inc., San Jose, CA (US)

(72) Inventors: Munish Mehta, Fremont, CA (US); Saurabh Jain, Fremont, CA (US); Praveen Jain, Cupertino, CA (US); Ronak K. Desai, Fremont, CA (US); Yibin Yang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 94 days.

(21) Appl. No.: 15/367,317

(22) Filed: Dec. 2, 2016

(65) Prior Publication Data

US 2018/0159781 A1    Jun. 7, 2018

(51) Int. Cl.
*H04L 12/815* (2013.01)
*H04L 12/24* (2006.01)
(Continued)

(52) U.S. Cl.
CPC .......... *H04L 47/22* (2013.01); *H04L 41/0893* (2013.01); *H04L 41/12* (2013.01); *H04L 45/16* (2013.01); *H04L 49/70* (2013.01); *H04L 45/42* (2013.01); *H04L 45/48* (2013.01); *H04L 45/64* (2013.01)

(58) Field of Classification Search
CPC ..... H04L 47/22; H04L 41/0893; H04L 41/12; H04L 49/70; H04L 45/16
See application file for complete search history.

(56) References Cited

U.S. PATENT DOCUMENTS 6,370,142 B1    4/2002   Pitcher et al.
9,276,838 B2    3/2016   Lee et al.
(Continued)

OTHER PUBLICATIONS

International Search Report and Written Opinion in corresponding International Application No. PCT/US2017/063362, dated Feb. 13, 2018, 13 pages.
(Continued)

*Primary Examiner* — Kevin C. Harper
*Assistant Examiner* — Derrick V Rose
(74) *Attorney, Agent, or Firm* — Edell, Shapiro & Finnan, LLC

(57) ABSTRACT

Presented herein are traffic pruning techniques that define the pruning at the group level. A software defined network (SDN) controller determines first and second endpoint groups (EPGs) of an SDN associated with the SDN controller. The SDN runs on a plurality of networking devices that interconnect a plurality of endpoints that are each attached to one or more host devices. The SDN controller determines a host-EPG mapping for the SDN, as well as a networking device-host mapping for the SDN. The SDN controller then uses the host-EPG mapping, the networking device-host mapping, and one or more group-based policies associated with traffic sent from the first EPG to the second EPG to compute hardware pruning policies defining how to prune multi-destination traffic sent from the first EPG to the second EPG. The hardware pruning policies are then installed in one or more of the networking devices or the host devices.

20 Claims, 7 Drawing Sheets

(51) Int. Cl.
*H04L 12/761* (2013.01)
*H04L 12/931* (2013.01)
*H04L 12/715* (2013.01)
*H04L 12/717* (2013.01)
*H04L 12/753* (2013.01)

(56) References Cited

U.S. PATENT DOCUMENTS

| | | | |
|---|---|---|---|
| 9,397,917 B2 | 7/2016 | Li et al. | |
| 2014/0123211 A1* | 5/2014 | Wanser | H04L 63/10 |
| | | | 726/1 |
| 2014/0162629 A1* | 6/2014 | Tipton | H04W 24/02 |
| | | | 455/423 |
| 2015/0063112 A1 | 3/2015 | Wu et al. | |
| 2015/0124809 A1 | 5/2015 | Edsall et al. | |
| 2015/0188731 A1* | 7/2015 | Daly | H04L 12/5689 |
| | | | 709/224 |
| 2016/0315848 A1* | 10/2016 | Weinstein | H04L 12/4633 |
| 2017/0063696 A1* | 3/2017 | Viquez | H04L 47/24 |
| 2017/0180213 A1* | 6/2017 | Li | H04L 41/12 |

OTHER PUBLICATIONS

Y. Nakagawa, et al., "Dynamic Virtual Network Configuration between Containers using Physical Switch Functions for NFV Infrastructure", 2015 IEEE Conference on Network Function Virtualization and Software Defined Network (NFV-SDN), San Francisco, CA, Nov. 18-21, 2015, 7 pages.

"Network Functions Virtualisation (NVF); Ecosystem; Report on SDN Usage in NFV Architectural Framework", ETSI GS NFV-EVE 005 V1.1.1 (Dec. 2015), Group Specification, Dec. 2015, 125 pages.

"Understanding VLAN Trunk Protocol (VTP)", https://www.cisco.com/c/en/us/support/docs/lan-switching/vtp/10558-21.html, Document ID: 10558, Jul. 30, 2007, 8 pages.

"802.1ak—Multiple Registration Protocol", http://www.ieee802.org/1/pages/802.1ak.html, May 5, 2015, 3 pages.

Kimi Zhang, "How ML2/VXLAN works", https://kimizhang.wordpress.com/2014/04/01/how-ml2vxlan-works/, Apr. 1, 2014, 8 pages.

"Cisco Application Centric Infrastructure Fundamentals, Releases 2.x and 3.x", https://www.cisco.com/c/en/us/td/docs/switches/datacenter/aci/apic/sw/1-x/aci-fundamentals/b_ACI-Fundamentals.html, first published Aug. 1, 2014, last modified Aug. 28, 2018, pp. 1-100.

"Cisco Application Centric Infrastructure Fundamentals, Releases 2.x and 3.x", https://www.cisco.com/c/en/us/td/docs/switches/datacenter/aci/apic/sw/1-x/aci-fundamentals/b_ACI-Fundamentals.html, first published Aug. 1, 2014, last modified Aug. 28, 2018, pp. 101-200.

"Cisco Application Centric Infrastructure Fundamentals, Releases 2.x and 3.x", https://www.cisco.com/c/en/us/td/docs/switches/datacenter/aci/apic/sw/1-x/aci-fundamentals/b_ACI-Fundamentals.html, first published Aug. 1, 2014, last modified Aug. 28, 2018, pp. 201-312.

* cited by examiner

GROUP-BASED PRUNING IN A SOFTWARE DEFINED NETWORKING ENVIRONMENT

TECHNICAL FIELD

The present disclosure relates to traffic pruning in a software defined network.

BACKGROUND

Software defined networking presents a standards based control and data plane solution for building the next generation data centers. For example, the Application Centric Infrastructure provided by Cisco® is a software defined networking solution designed to automate, configure, and manage data center fabrics, and has become popular in enterprise data center environments. Cisco is a registered trademark of Cisco Technology, Inc.

In certain cases, a data center may serve different tenants (i.e., multiple different organizations, separate entities within an organization, etc.). Such data centers, sometimes referred to as multi-tenant data centers, provide logical separation/segregation between each of the different tenants, as well as security, scalability, and per-tenant services, all of which are designed to simplify management and orchestration. As the use of virtualization within data centers expands, security and management are becoming increasingly important.

DESCRIPTION OF EXAMPLE EMBODIMENTS

Overview

Figure 1:
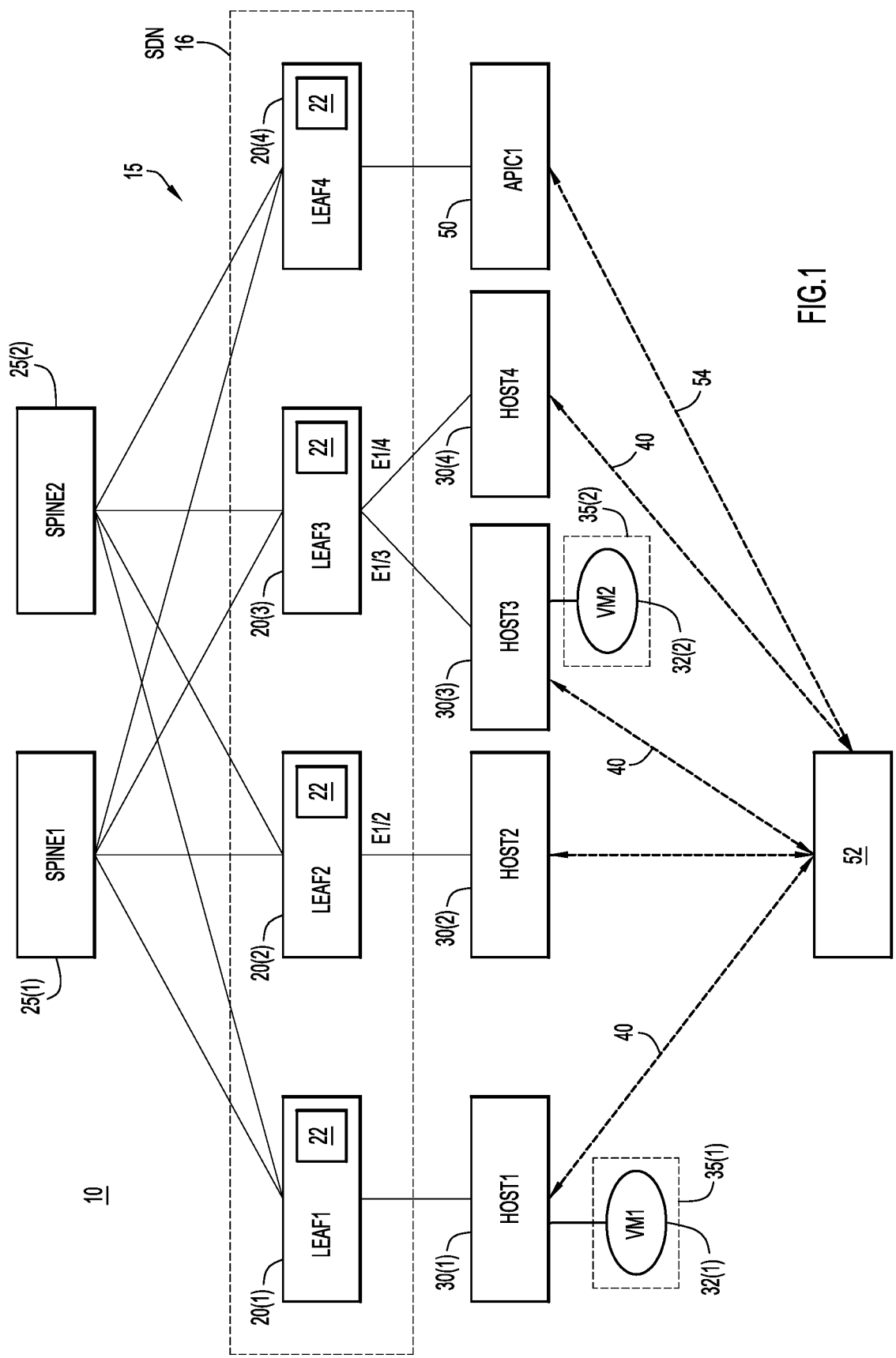
FIG. 1 is a block diagram of a network environment configured to implement group-based pruning techniques, according to an example embodiment.

Presented herein are traffic pruning techniques that define the pruning at the group level. A software defined network (SDN) controller determines first and second endpoint groups (EPGs) of an SDN associated with the SDN controller. The SDN runs on a plurality of networking devices that interconnect a plurality of endpoints that are each attached to one or more host devices. The SDN controller determines a host-EPG mapping for the SDN, as well as a networking device-host mapping for the SDN. The SDN controller then uses the host-EPG mapping, the networking device-host mapping, and one or more group-based policies associated with traffic sent from the first EPG to the second EPG to compute hardware pruning policies defining how to prune multi-destination traffic sent from the first EPG to the second EPG. The hardware pruning policies are then installed in one or more of the networking devices or the host devices.

Detailed Description

The group-based policy (GBP) framework provides an intent-driven declarative policy model which can drastically simplify application deployment. The GBP framework builds on the principle of capturing application requirements directly instead of converting the requirements into specific infrastructure configurations or protocols. More specifically, the GBP framework is based on the concepts of "groups" and "policy model." A group represents a logical collection of network endpoints (endpoints) and fully describes the endpoint properties. These properties are not limited to network addresses (e.g., Internet Protocol (IP) or Media Access Control (MAC) addresses), but instead can include a wide variety of attributes associated with the endpoints, such as the operating system the endpoints run, common substrings in the assigned endpoint names, associated security tags, etc. The policy model describes the relationships between the different logical groups. For example, the policy model includes "policy rule sets" that are used to create restrictions on traffic between different groups. As such, the policy rule sets offer a simple way to describe how collections of endpoints can communicate, without resorting to network details such as the IP routes and access control lists (ACLs).

Certain software defined networking technologies, such as the Application Centric Infrastructure (ACI) provided by Cisco®, make use of the GBP framework to provide application policy-based solutions through scalable distributed enforcement. Cisco is a registered trademark of Cisco Technology, Inc. Such software defined networking technologies generally support integration of physical and virtual environments under one declarative policy model for networks, servers, services, and security. Merely for ease of illustration, the examples presented herein are described with reference to the ACI framework. However, it is to be appreciated that the examples presented herein may be used with other software defined networking technologies that utilize the GBP framework.

In the ACI framework, the groups of endpoints are referred to as Endpoint Groups (EPGs). In general, an EPG is a collection of end points that share common policy requirements such as security, Quality of Service (QoS), and services. Application policies can be applied between EPGs, rather than to endpoints directly, in the form of contracts. In certain virtualized environments, such as VMWare vSphere®, EPGs are implemented/defined as distributed virtual switch (DVS) port groups. VMWare vSphere is a registered trademark of VMware, Inc. A virtual machine (VM) which belongs to an EPG is attached to the DVS port group associated with the EPG. Merely for ease of illustration, the examples presented herein are described with reference to the use of DVS port groups (e.g., in the VMWare vSphere virtualized platform) to define an EPG. However, it is to be appreciated that the examples may be used with other constructs and other virtualized platforms, such as the Microsoft® virtualization platforms/solutions, where an EPG is defined using a different data structure. Microsoft is a registered trademark of Microsoft Corporation.

Multi-destination traffic, sometimes referred to as broadcast, unknown unicast, and multicast (BUM) traffic, can consume a large amount of network bandwidth due to a large number of potential recipients. Traffic pruning (pruning) is a mechanism to reduce multi-destination traffic among endpoints. Through pruning, a limit is put on the scope of multi-destination traffic delivery so that only those switches and hosts related to the intended recipient endpoints can receive and forward the traffic. Traditionally, pruning is done at different network layers such as layer 2 (L2) and layer 3 (L3) and relies on the respective network addresses (e.g., IP and/or MAC addresses) of the endpoints. Different network protocols, such as the Virtual Local Area Network Trunking Protocol (VTP) and the Multiple VLAN Registration Protocol (MVRP), are used to facilitate pruning based on specific network addressing schemes. That is, these and other conventional pruning protocols rely on the network addresses of the endpoints to execute the pruning and are sometimes referred to herein as network address-based pruning protocols.

The reliance of conventional pruning protocols on the network addresses of endpoints makes the conventional pruning protocols ill-suited for operation with the GBP framework. For example, since in the GBP framework policies are specified at the group level instead of individual endpoint level, application deployment cannot scale if fine grain layer 2 network configurations have to be performed. Also, since in the GBP framework an endpoint's group membership may be determined by attributes other than network address (i.e., the endpoint operating system, substring in the assigned endpoint name, etc.), an endpoint can dynamically change from one group to another, without changing its network address. As a result, a network address based pruning protocol will not be group aware and thus will likely not function well.

Due to the above and other problems preventing the effective use of conventional pruning protocols (i.e., network address-based pruning protocols) with the GBP framework, the techniques presented are directed to group-based pruning techniques. More specifically, in accordance with the techniques presented herein, pruning behavior is specified on the group level (i.e., for groups of endpoints), and not at the endpoint or switch address level. As such, the group-based pruning techniques presented herein are independent of any addressing scheme. The group-based pruning techniques presented herein also make use of a software defined network out-of-band mechanism to track endpoints and their group memberships and use the software defined network to automatically provision the network fabric for the pruning of multi-destination traffic. In other words, the group-based pruning techniques presented herein not only fit into the GBP framework, but also leverage the software defined networking infrastructure.

FIG. 1 is a schematic diagram of a software defined network deployment in a data center 10. The data center 10 includes a network fabric 15 having a set of interconnected networking devices/nodes in a leaf and spine architecture (e.g., CLOS network topology). More specifically, the network fabric 15 comprises a plurality of leaf nodes (e.g., leaf switches) 20(1)-20(4) and a plurality of spine nodes (e.g., spine switches) 25(1)-25(2). In general, a leaf and spine architecture, such as that shown in FIG. 1, creates a low-latency, scalable network fabric. However, it is to be appreciated that the leaf and spine architecture of FIG. 1 is merely an example of a network architecture in which the techniques described herein may be implemented.

The network fabric 15 may be, for example, an Internet Protocol (IP) local area network (LAN). The network fabric 15 may also include or support one or more overlay/encapsulated networks forming a software defined network (SDN). For ease of illustration, the SDN, and the overlay network(s) forming the SDN, are collectively and generally represented in FIG. 1 by the dashed cloud 16.

Attached to the network fabric 15 is a plurality of host devices (hosts) 30(1)-30(4) which may be, for example, servers or other types of computing devices. Hosts 30(1) and 30(2) are connected to leaf nodes 20(1) and 20(2), respectively, while hosts 30(3) and 30(4) are both connected to leaf node 20(3). The leaf nodes 20(1)-20(3) each include a hardware traffic forwarding module (e.g., traffic forwarding Application Specific Integrated Circuit) 22 that is configured to enforce group-based pruning on traffic in the SDN 16.

The data center 10 also includes a software defined network (SDN) controller 50 (e.g., Application Policy Infrastructure Controller (APIC)) that is connected to the leaf node 20(4). The SDN controller 50 provides a single point of automation and management for the SDN 16 (e.g., the ACI overlay). For ease of description, only one SDN controller 50 is shown in FIG. 1. However, it is to be appreciated that other arrangements may include multiple SDN controllers for redundancy, load balancing, etc.

Also shown in FIG. 1 is a virtualized environment controller 52 (e.g., VMWare vCenter) that is connected to the hosts 30(1)-30(4). That is, the hosts 30(1)-30(4) are under the management of the same virtualized environment controller 52. Communication between the virtualized environment controller 52 and the hosts 30(1)-30(4) is generally represented in FIG. 1 by the bi-directional arrows 40.

Two virtual machines, virtual machine 32(1) (vm1) and virtual machine 32(2) (vm2), are attached to (i.e., run on) hosts 30(1) and 30(3), respectively. The virtual machines 32(1) and 32(2) are endpoints of the SDN 16 and each belong to (i.e. are included in) different EPGs of the SDN 16. Virtual machine 32(1) is included in EPG 35(1), while virtual machine 32(2) is included in EPG 35(2). It is to be appreciated that the presence of two virtual machines and two EPGs is merely for ease of description and illustration and that, in practice, a software defined network may include more than two EPGs that each includes multiple endpoints (e.g., virtual machines).

The SDN controller 50 is configured to communicate with the virtualized environment controller 52 via a dedicated control channel 54. In one example, the SDN controller 50 may communicate with the virtualized environment controller 52 using one or more Application Program Interfaces (APIs). This communication enables the SDN controller 50 to retrieve inventories, such as lists of virtual switches and virtual machines, as well as perform configuration such as creating DVS instances and port groups.

The SDN 16 running in data center 10 is configured such that there is logical separation between different "tenants" of the data center. That is, the tenants operate on different "sub-networks" that are specific to each tenant. These sub-networks, sometimes referred to herein as bridge domains (BD), may be created through the use of one or more overlay networks and include logical network links that carry traffic for only the associated tenant. That is, the different tenants in a software defined network are logically segregated from one another, meaning that endpoints associated with one tenant cannot directly communicate with endpoints associated with other tenants via interconnecting network devices.

In general, a bridge domain is a broadcast domain and can be associated with multiple EPGs. Endpoints associated with the same bridge domain, but with different EPGs, can communicate with each other when there is a defined contract between the EPGs to communicate. In one known scaled setup, as many as four hundred (400) EPGs are configured under one bridge domain. In such a case, it is important to conserve network bandwidth consumed by the flooding of broadcast, unknown unicast and multicast (BUM) (i.e., multi-destination) traffic.

For example, a contract may be defined in the arrangement of FIG. 1 that allows endpoints associated with EPG 35(1) to send traffic to endpoints associated with EPG 35(2). The virtual machine 32(1) may attempt to send multi-destination (BUM) traffic to endpoints in EPG 35(2). Since multi-destination traffic is delivered through flooding, in conventional arrangements (i.e., arrangements that do not utilize the group-based pruning techniques described herein), the multi-destination traffic sent by virtual machine 32(1) reaches host 30(2) (via leaf node 20(2)) as well as hosts 30(3) and 30(4) (via leaf node 20(3)). However, the traffic will be dropped in both host 30(2) and host 30(4) because they do not host/support any endpoints in EPG 35(2). That is, virtual machine 32(2), which is the only endpoint in EPG 25(2), is located/running only at host 30(3). As a result, in these conventional arrangements, network bandwidth used to deliver the multi-destination traffic to host 30(2) and host 30(4) is wasted. In addition to network bandwidth, a significant amount of unnecessary traffic is sent to virtual hosts, which clogs the uplink network interfaces of the hosts, as well as wastes central processor unit (CPU) cycles.

As noted above, presented herein are group-based pruning techniques that operate within a GBP framework, such as that shown in FIG. 1. The techniques presented specify pruning behavior on a group basis (e.g., for an EPG) and use a software defined network out-of-band mechanism to track endpoints and their group memberships. The techniques presented herein also use the software defined network to automatically provision the network fabric for the control of multi-destination traffic delivery.

As noted above, the GBP framework is based on the concepts of groups of endpoints and a policy model to describe the relationships between the different groups (i.e., to describe connectivity, security, and network services between groups). The primitives of the policy model separate their semantics from the underlying infrastructure capabilities. The primary primitives in a GBP policy model are shown below in Table 1.

TABLE 1

| Resource | Description |
| --- | --- |
| Policy Target | An individual network endpoint (generally a NIC). A policy target is a basic addressable unit in the architecture. |
| Policy Group | Policy targets with the same properties are organized into policy groups, which is the fundamental primitive of GBP. Policy groups offer an infrastructure agnostic grouping construct without specifying any network semantics in the same way as a broadcast. Each group models its dependencies by declaring the rule sets that it provides to other groups as well as rule sets that it will consume. |
| Policy Classifier | A means of filtering network traffic, including protocol, port range, and direction (in, out, or bidirectional). |
| Policy Action | An action to take when a particular rule is applied. The supported types include "allow" and "redirect." |
| Policy Rules | Classifiers paired with actions. |
| Policy Rule Sets | Policy rule sets contain a number of policy rules. Rule sets can be nested through parent-child relationships. |

In order to specify pruning behavior on a group basis, the techniques presented herein expand the GBP "policy classifier" primitive to specify multi-destination traffic. For example, an expanded policy classifier in accordance with examples presented herein that includes all layer 2 BUM traffic may be:
gbp policy-classifier-create bum-traffic-protocol ether-destination broadcast, unknown, multicast.

Figure 2A:
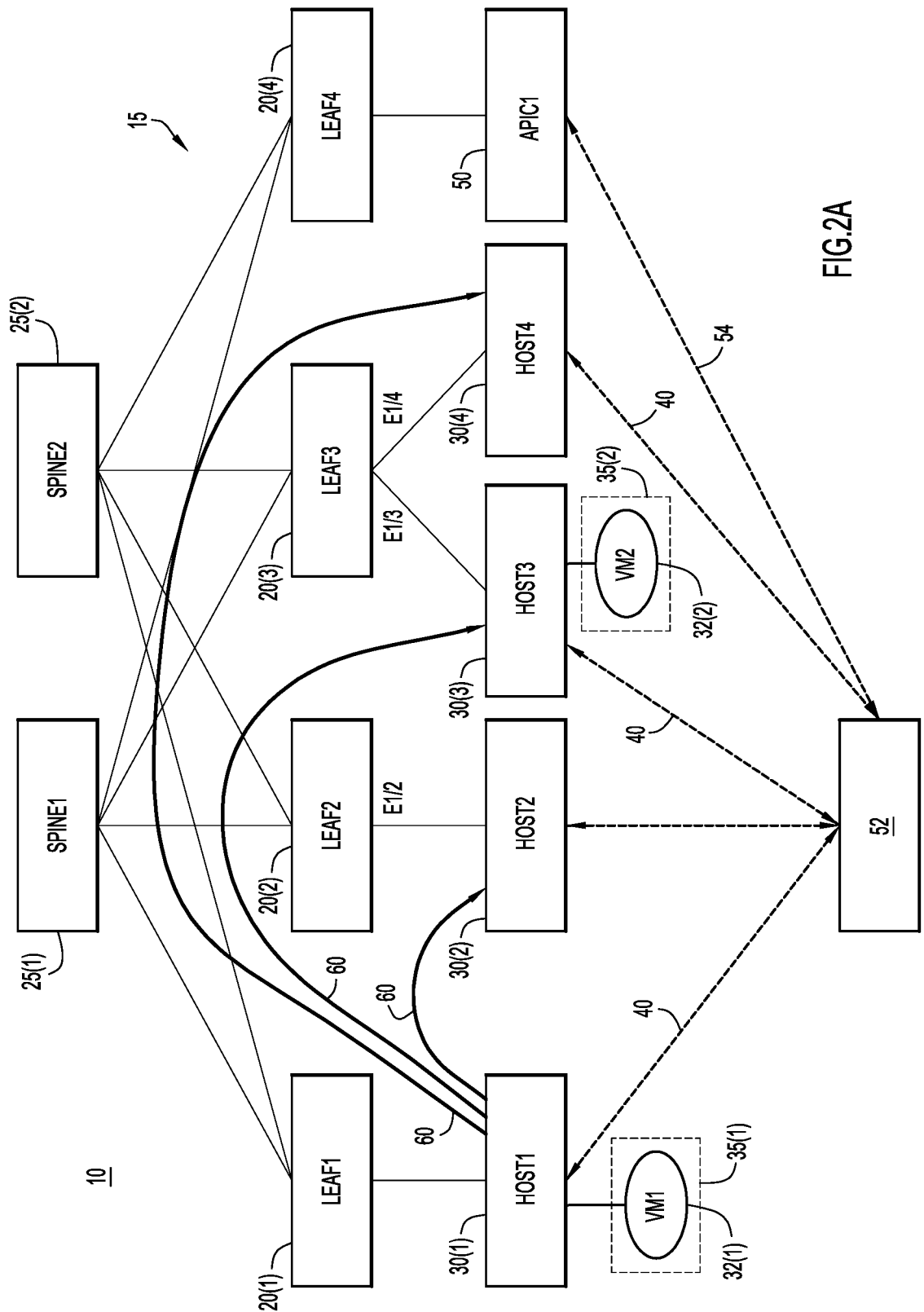
FIGS. 2A, 2B, and 2C are block diagrams illustrating different group-based pruning schemes, according to example embodiments.
Figure 2B:
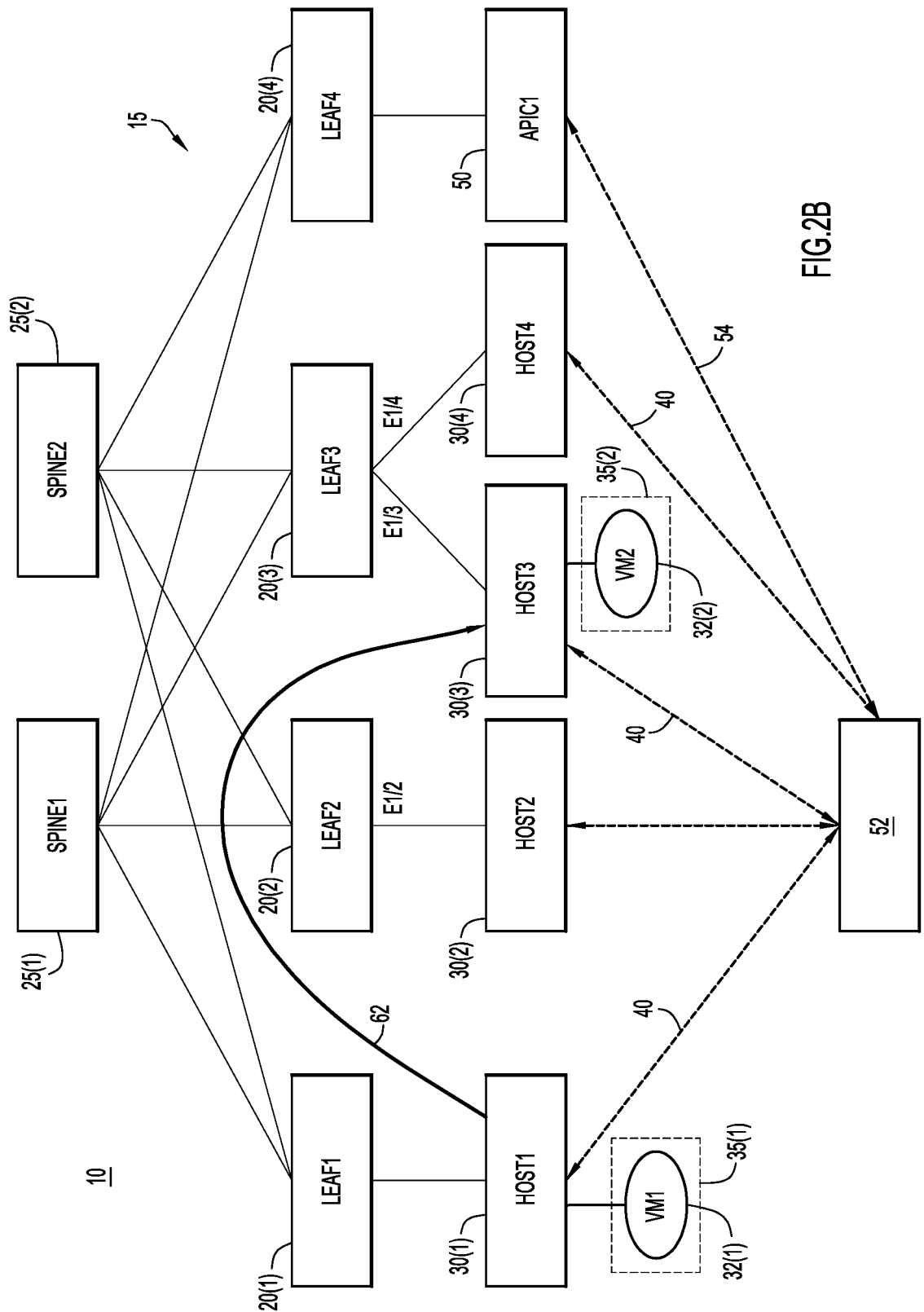
Figure 2C:
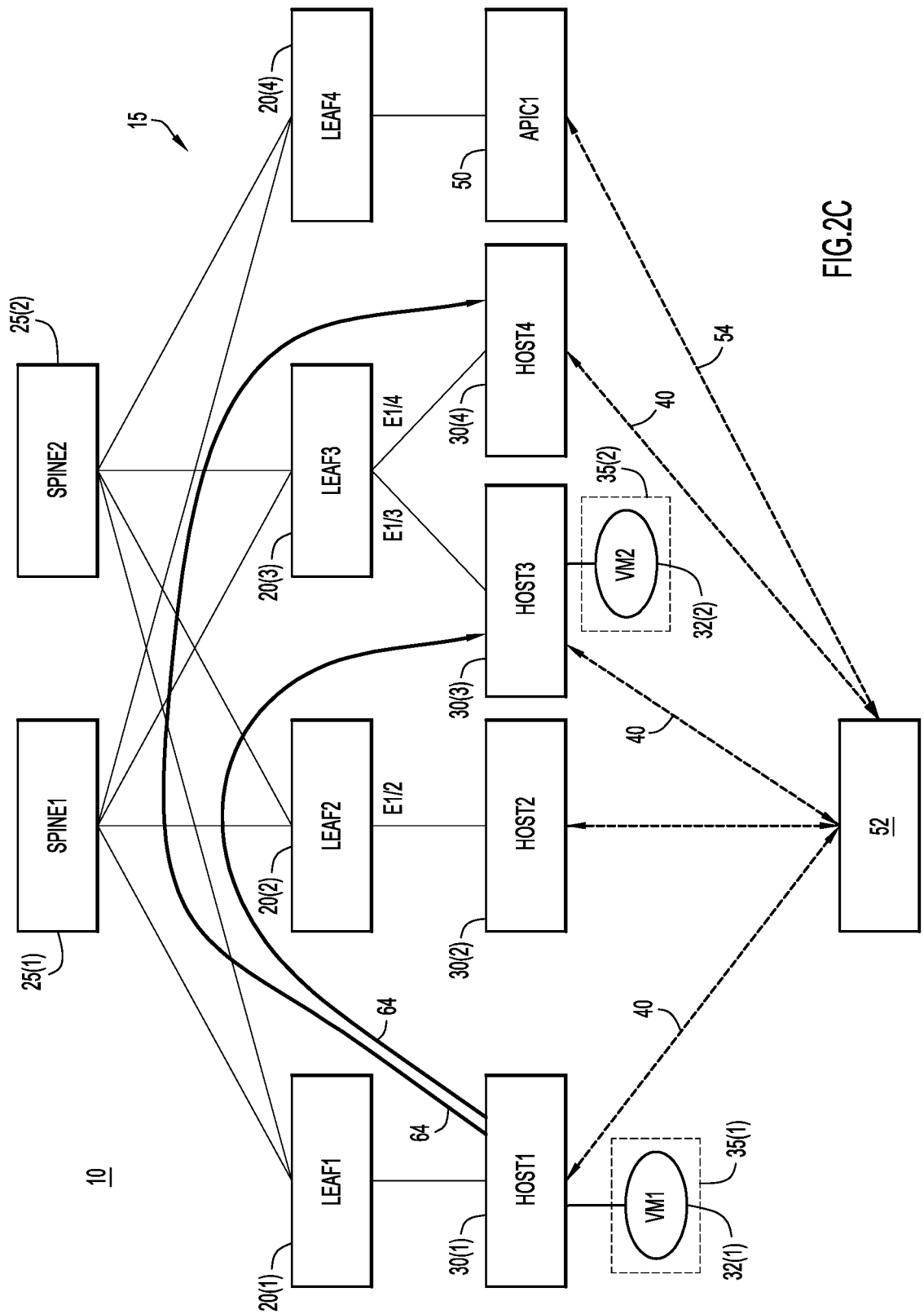

The techniques presented herein also expand the GBP policy rule associated with the expanded policy classifier to specify pruning behavior. There are, in general, three possible pruning behaviors that may be implemented in accordance with the examples presented. These three pruning behaviors are shown in FIGS. 2A, 2B, and 2C with reference to the arrangement of FIG. 1. More specifically, FIG. 2A illustrates an arrangement that executes "no pruning" (i.e., pruning is disabled) such that multi-destination traffic is delivered regardless of endpoint presence.

For instance, in the example of FIG. 2A, a contract allows endpoints associated with EPG 35(1) to send traffic to endpoints associated with EPG 35(2). If virtual machine 32(1) sends multi-destination traffic to endpoints in EPG 35(2), then, as shown by arrows 60, this traffic will be reach host 30(2) (via leaf node 20(2)) as well as hosts 30(3) and 30(4) (via leaf node 20(3)). The traffic is then dropped in both host 30(2) and host 30(4) because they do not host any endpoints in EPG 35(2). That is, virtual machine 32(2), which is the only endpoint in EPG 25(2), is located only at host 30(3).

In the no pruning example, the techniques presented herein add the following rule to enforce pruning:
gbp policy-rule-create pruning-rule-classifier bum-traffic-actions no-pruning.

FIG. 2B illustrates an arrangement that executes "strict pruning" (i.e., pruning is strictly enforced) such that multi-destination traffic is only delivered to those leaf nodes (switches) and hosts that are known to be in the path to reach an endpoint in the group. For instance, in the example of FIG. 2B, a contract allows endpoints associated with EPG 35(1) to send traffic to endpoints associated with EPG 35(2). If virtual machine 32(1) sends multi-destination traffic to endpoints in EPG 35(2), then, as shown by arrows 62, the strict pruning ensures that this traffic will be only reach host 30(3) (via leaf node 20(3), since the only endpoint in EPG 25(2) is located only at host 30(3). That is, in strict pruning, when leaf node 20(1) receives the multi-destination traffic sent by virtual machine 32(1), leaf node 20(1) will send the traffic to leaf node 20(3) only through either head end replication or an IP multicast tree. When the leaf node 20(3) receives the multi-destination traffic sent by virtual machine 32(1) (i.e., forwarded by leaf node 20(1), the leaf node 20(3) will send to host 30(3) only, through interface e1/3.

In the strict pruning example, the techniques presented herein add the following rule to enforce pruning:
gbp policy-rule-create pruning-rule-classifier bum-traffic-actions strict-pruning.

FIG. 2C illustrates an arrangement that executes "relaxed pruning" (i.e., pruning is liberally enforced) such that multi-destination traffic is delivered to those leaf nodes (switches) and hosts that are known to in the path to reach an endpoint in the group, as well as other leaf nodes and hosts that are likely to be in the path to reach an endpoint in the group in the future. The inclusion of switches and hosts that are likely will be in the path to reach an endpoint in the group in the future facilitates endpoint mobility at the cost of network bandwidth.

For instance, in the example of FIG. 2C, a contract allows endpoints associated with EPG 35(1) to send traffic to endpoints associated with EPG 35(2). If virtual machine 32(1) sends multi-destination traffic to endpoints in EPG 35(2), then, as shown by arrows 64, the relaxed pruning ensures that this traffic will be reach hosts 30(3) and 30(4) (via leaf node 20(3)). The multi-destination traffic reaches host 30(3) because the only endpoint in EPG 25(2) (i.e., virtual machine 32(2)) is located only at host 30(3). The multi-destination traffic reaches host 30(4) because leaf node 20(3) determines that host 30(4) is likely to be in the path to reach virtual machine 32(2) in the future. For example, hosts 30(3) and 30(4) are set up as a backup pair so that in the event of one host's failure, its hosted VMs will migrate to the other host.

In the relaxed pruning example, the techniques presented herein add the following rule to enforce pruning:
gbp policy-rule-create pruning-rule-classifier bum-traffic-actions relaxed-pruning.

In addition to creation of one of the pruning rules described above, the techniques presented herein also leverage the existing GBP ruleset and group-update commands to apply the traffic pruning on the group basis. For example, a pruning policy can be defined as:
gbp ruleset-create pruning-ruleset-policy-rules pruning-rule
gbp group-update group1-consumed-rulesets "pruning-ruleset=scope"
gbp group-update group2-provided-rulesets "pruning-ruleset=scope."

Figure 3:
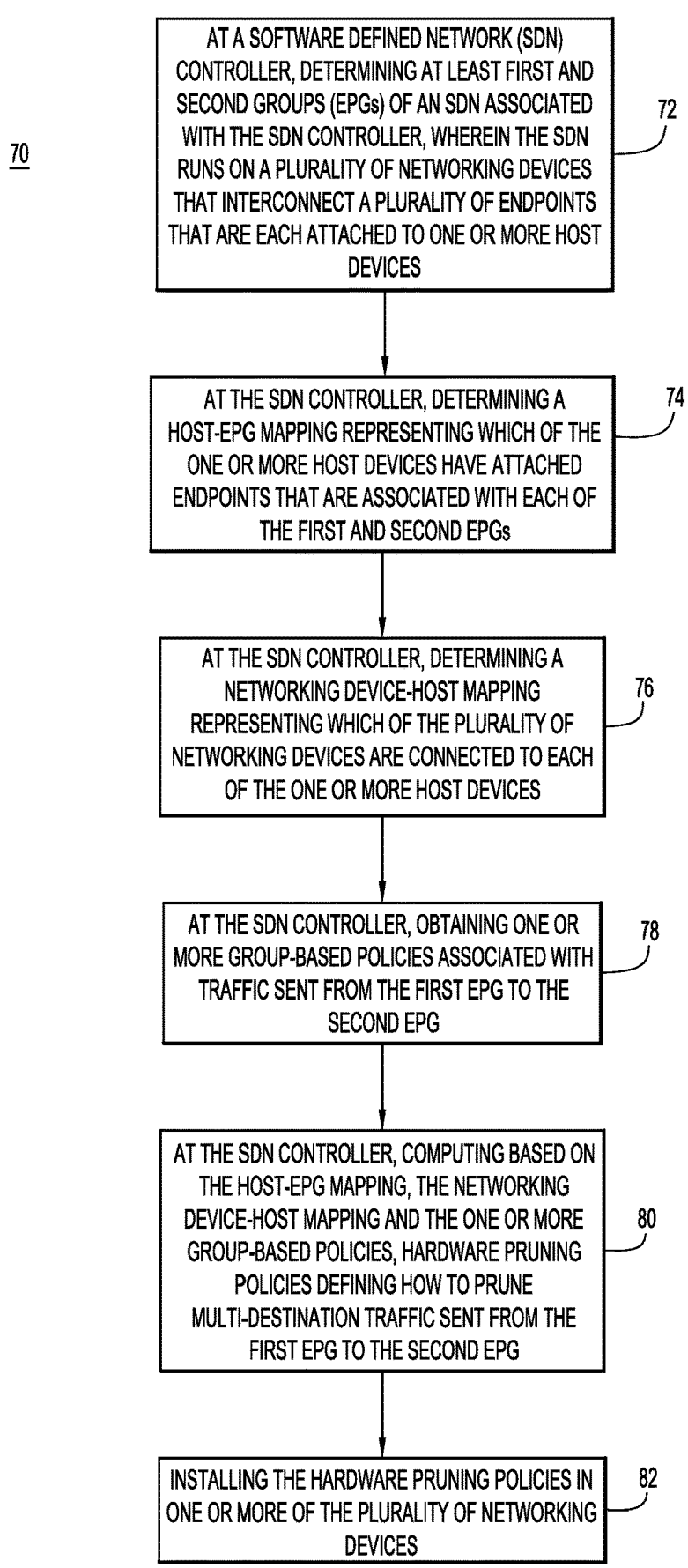
FIG. 3 is a flowchart of a method, according to an example embodiment.

In addition to defining a group based pruning policy, the techniques presented herein also leverage the SDN infrastructure to gather endpoint information, including its group membership, and install traffic control configuration in the network fabric automatically. That is, the programming is driven out-of-band by policies and information from the SDN controller 50, rather than through an in-band pruning protocol. For example, FIG. 3 is a flowchart illustrating an example method 70 in accordance with the techniques presented herein. For ease of illustration, the method of FIG. 3 is described with reference to the arrangement of FIG. 1.

Method 70 begins at 72 where the SDN controller 50 determines the EPGs that are present in the SDN 16 which, in the example of FIG. 1, comprise first EPG 35(1) and second EPG 35(2). The SDN controller 50 may also define a virtual data structure for each of the EPGs present in SDN 16. For example, the SDN controller 50 can create a DVS port group for each of the EPGs 35(1) and 25(2) using vSphere APIs. As described above, EPGs 35(1) and 35(2) are part of SDN 16 that is associated with SDN controller 50. The SDN runs on a plurality of networking devices (e.g., leaf nodes 20(1), 20(2), and 20(3)) that interconnect a plurality of endpoints (e.g., virtual machines 32(1) and 32(2)) that are each attached to one or more host devices 30(1)-30(4).

At 74, for each EPG, the SDN controller 50 determines a host-endpoint group (host-EPG) mapping. That is, the SDN controller 50 learns which hosts 30(1)-30(4) have attached (i.e., connected, hosted, etc.) endpoints that belong to each of EPG 25(1) and 35(2) (e.g., learn the endpoints associated with the DVS port group associated with the EPG).

In the examples presented herein, the SDN controller 50 determines the host-EPG mapping using an out-of-band mechanism, namely based on data obtained from the virtualized environment controller 52 (e.g., through inventory pulling or event notification using vSphere APIs), rather than through the data plane (i.e., using a non-data control channel). The use of this dedicated control channel between the SDN controller 50 and the virtualized environment controller 52 to determine the host-endpoint mapping, rather than determining this mapping from the data plane, means that the host-endpoint mapping is determined "out-of-band."

At 76, the SDN controller 50 determines a leaf node-host mapping for the SDN 16. That is, the SDN controller 50 learns which hosts 30(1)-30(4) are attached to each leaf node. In certain examples, the leaf nodes 20(1)-20(3) each provide data representing segments of the leaf node-host mapping to the SDN controller 50. In such examples, each of the leaf nodes 20(1)-20(3) use a discovery protocol, such as the Cisco Discovery Protocol (CDP), the Institute of Electrical and Electronics Engineers (IEEE) Link Layer Discovery Protocol (LLDP), OpFlex, etc., to learn the hosts that are connected thereto. For example, in the arrangement of FIG. 1, leaf node 20(2) learns that host 30(2) is attached thereto via port "e1/2." Leaf node 20(3) learns that host 30(3) and host 30(4) are attached via ports "e1/3" and "e1/4," respectively. The leaf nodes 20(1)-20(3) then pass this data to the SDN controller 50 via a control channel. As such, the use control channels between the SDN controller 50 and the leaf nodes 20(1)-20(3) to determine the leaf node-host mapping, rather determining this mapping from the data plane, means that the host-endpoint mapping is determined "out-of-band."

At 78, the SDN controller 50 obtains one or more group-based policies associated with traffic sent from the first EPG 35(1) to the second EPG 35(2). At 80, based on the host-endpoint mapping (e.g., received from the virtualized environment controller 52), the leaf node-host mapping (e.g., obtained from the leaf nodes 20(1)-20(3)), and the one or more group-based policies, the SDN controller 50 computes hardware pruning policies to control (i.e., prune) flooding traffic sent from the first EPG 35(1) to the second EPG 35(2). At 82, the SDN controller 50 installs the group-based policies in the network fabric 15.

In one example, if a leaf node has at least one endpoint of the destination EPG attached, the hardware of the leaf node is automatically programmed by the SDN controller to prevent the flooding traffic from being sent out to those ports which have no endpoint of the destination EPG attached. Otherwise, if the leaf node has no endpoint of the destination EPG attached, the hardware is automatically programmed by the SDN controller to prevent the flooding traffic from being sent to the leaf switch by removing the leaf switch from the flood replication list in either source leaf switches, if head end replication is used, or spine switches, if underlay IP multicast is used.

For example, referring specifically to the arrangement of FIG. 1, the policies (e.g., strict pruning) may dictate that the flooding traffic destined to EPG 35(2) should not be sent to leaf node 20(2) as there is no endpoint attached. In such examples, if head end replication is used, leaf node 20(2) is removed from replication lists of all other leaf nodes. Otherwise, if IP multicast is used, leaf node 20(2) is removed from replication lists of all spine nodes 25(1) and 25(2). The policies also dictate that the flooding traffic destined to EPG 35(2) should be sent to leaf node 20(3) only, as there is one endpoint (virtual machine 32(2)), at host 30(3). However, the policies indicate that the traffic should be blocked on all ports except for the port of leaf node 20(3) that is connected to host 30(3) (i.e., traffic is only forwarded on port e1/3 but not e1/4). In the case of using head-end replication for multi-destination traffic delivery, the SDN controller 50 downloads the pruning policies to leaf node 20(1) so that the traffic is replicated to leaf node 20(3) only. It also downloads pruning policies to leaf node 20(3) so that the traffic is egressed through port e1/3 only. The computation and downloading of the policies are down automatically by the SDN controller 50, without the involvement of administrators In summary, based on the out-of-band information obtained from one or more sources, an SDN controller can determine which network fabric devices and hosts the flooding traffic should reach. The SDN controller then computes and installs hardware pruning policies in the network fabric devices so that excessive flooding can be avoided.

Figure 4:
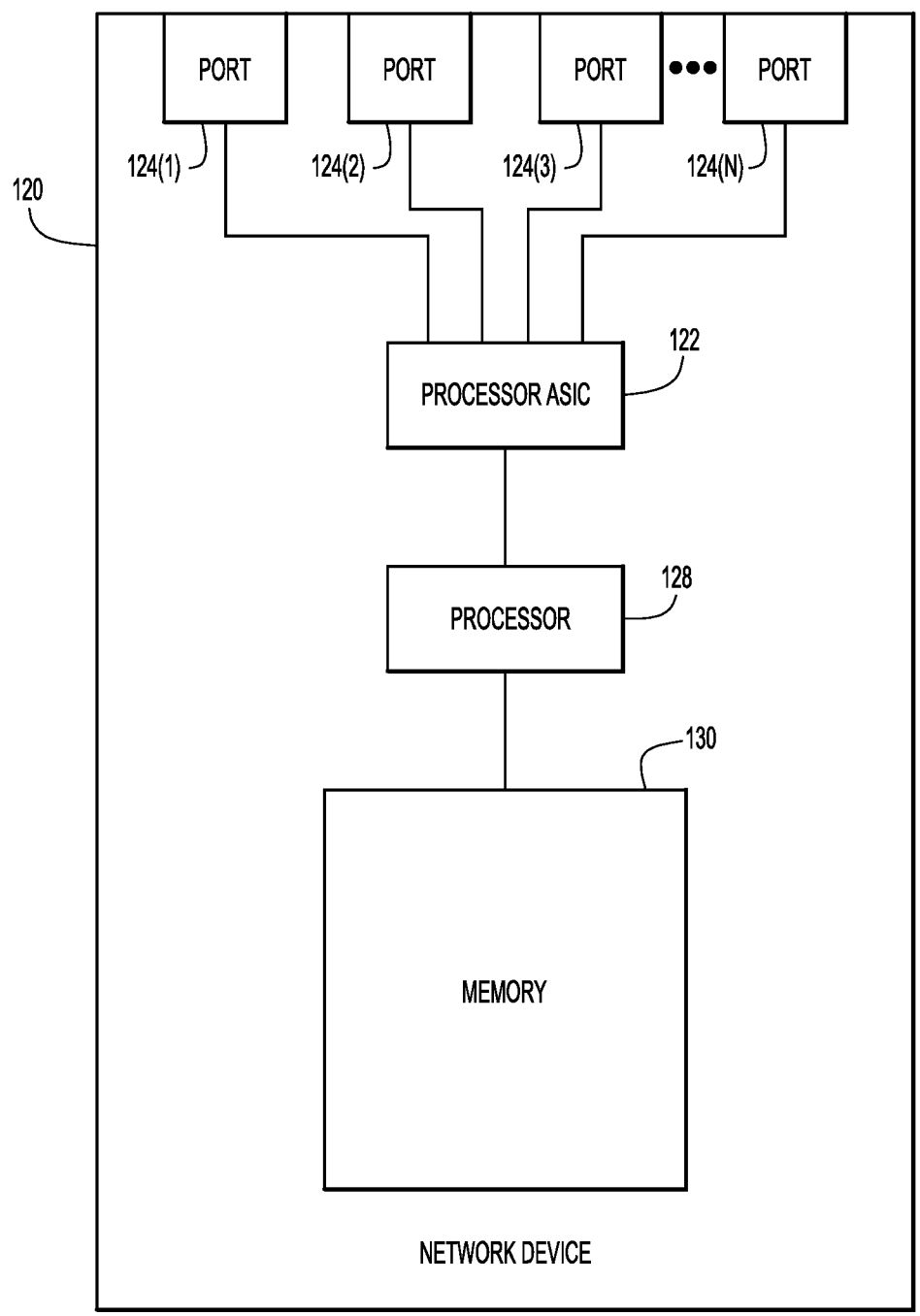
FIG. 4 is a block diagram of a networking device, according to an example embodiment.

FIG. 4 illustrates a block diagram of a networking device 120 (e.g., leaf node/switch) that is configured to participate in the techniques presented herein. The networking device 120 includes a network interface unit in the form of a plurality of network ports 124(1)-124(N), a processor Application Specific Integrated Circuit (ASIC) 122 that performs network processing/forwarding functions, one or more processors 128 (e.g., microprocessors or microcontrollers), and memory 130. It is to be understood that, in certain examples, the network device 120 may be a virtual (software-based) appliance.

The memory 130 may include read only memory (ROM), random access memory (RAM), magnetic disk storage media devices, optical storage media devices, flash memory devices, electrical, optical, or other physical/tangible memory storage devices. Thus, in general, the memory 130 may comprise one or more tangible (non-transitory) computer readable storage media (e.g., a memory device) encoded with software comprising computer executable instructions and when the software is executed (by the one or more processors 128) it is operable to perform the operations described herein with reference to a leaf node.

In accordance with the examples presented herein, the processor ASIC 122 is a hardware traffic forwarding module that may be configured to implement traffic pruning in accordance with the group-based pruning techniques presented. That is, the hardware pruning policies computed by the SDN controller (e.g., SDN controller 50), as described above, may be installed in, and enforced by, the processor ASIC 122.

Figure 5:
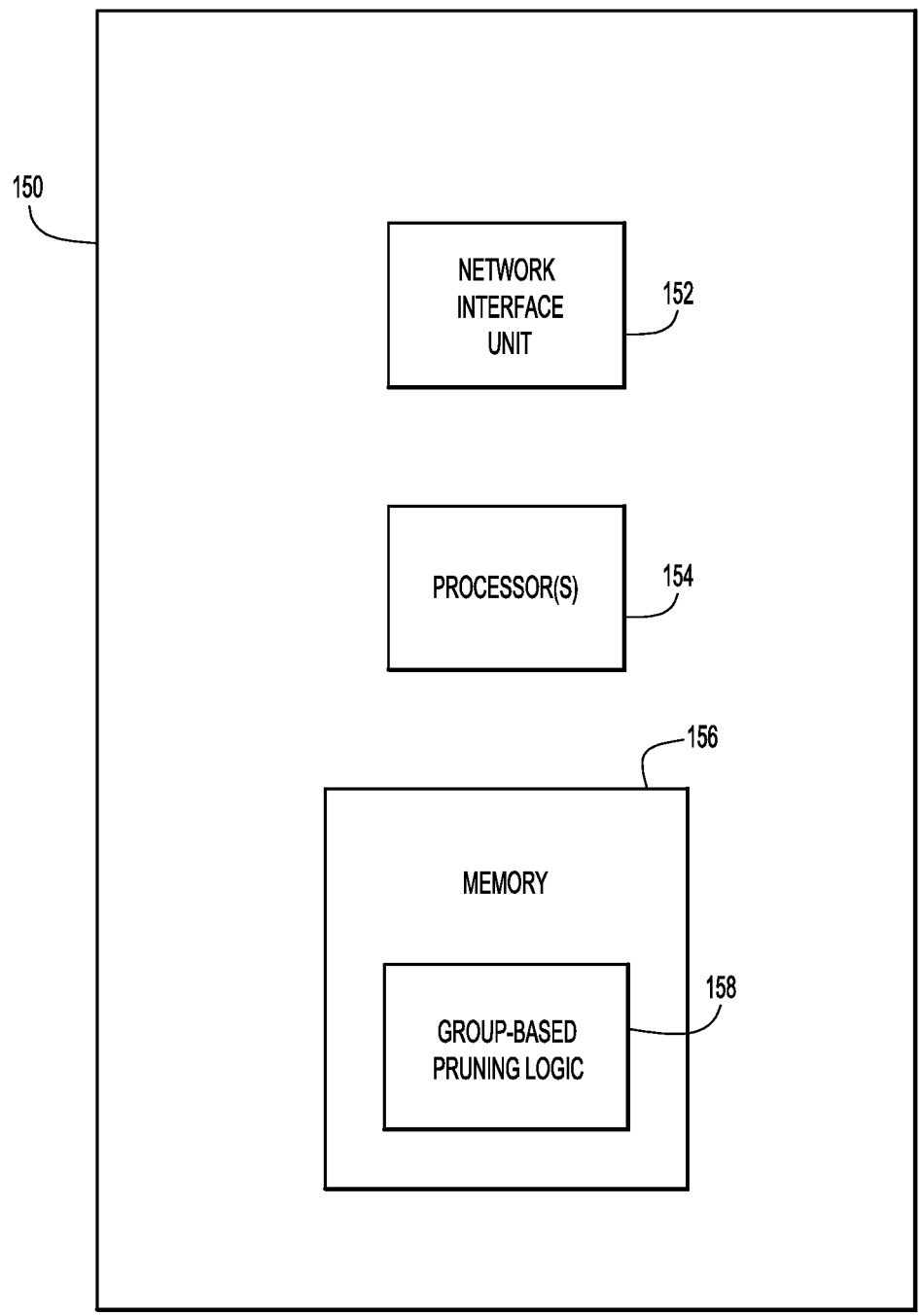
FIG. 5 is a block diagram of a software defined network controller in accordance with example embodiments presented herein.

FIG. 5 is a block diagram of an SDN controller 150 in accordance with examples presented herein. The SDN controller 150 includes a network interface unit 152, one or more processors 154, and a memory 156.

The network interface unit 152 facilitates network communications between the SDN controller 150 and networking nodes in a data center fabric. The one or more processors 154 may be microprocessors or microcontrollers that execute instructions associated with software stored in memory 156. Specifically, the memory 156 stores group-based pruning logic 158.

The memory 156 may comprise ROM, RAM, magnetic disk storage media devices, optical storage media devices, flash memory devices, electrical, optical, or other physical/tangible memory storage devices. In general, the memory 156 may comprise one or more tangible (non-transitory) computer readable storage media (e.g., a memory device) encoded with software comprising computer executable instructions and when the software is executed (by the one or more processors 154) it is operable to perform group-based pruning operations described herein with reference to an SDN controller.

As described above, traffic pruning is a mechanism to reduce multi-destination traffic in a network fabric. Conventional pruning techniques rely on the network addresses of endpoints to perform the pruning. Presented herein are group-based pruning techniques in which the pruning is independent of (i.e., does not rely upon) any addressing scheme. Also, the techniques presented herein use out-of-band mechanism to track endpoints and their group memberships and use the software defined network controller to automatically provision the network fabric for the control of multi-destination traffic delivery. The techniques presented herein may facilitate massive application deployment through group based pruning instead of complicated network configuration. The techniques presented herein may also reduce flooding in the network fabric while still remaining compatible with existing virtual switches which do not support any in-band pruning protocol.

In one form, a method implemented at a software defined network (SDN) controller is provided. The method comprises: determining at least first and second groups (EPGs) of an SDN associated with the SDN controller, wherein the SDN runs on a plurality of networking devices that interconnect a plurality of endpoints that are each attached to one or more host devices; determining a host-EPG mapping representing which of the one or more host devices have attached endpoints that are associated with each of the first and second EPGs; determining a networking device-host mapping representing which of the plurality of networking devices are connected to each of the one or more host devices; obtaining one or more group-based policies associated with traffic sent from the first EPG to the second EPG; computing based on the host-EPG mapping, the networking device-host mapping and the one or more group-based policies, hardware pruning policies defining how to prune multi-destination traffic sent from the first EPG to the second EPG; and installing the hardware pruning policies in one or more of the plurality of networking devices.

In another form, an apparatus is provided. The apparatus comprises a memory; a network interface unit; and a processor configured to: determine at least first and second groups (EPGs) of a software defined network (SDN) associated with the apparatus, wherein the SDN runs on a plurality of networking devices that interconnect a plurality of endpoints that are each attached to one or more host devices, determine a host-EPG mapping representing which of the one or more host devices have attached endpoints that are associated with each of the first and second EPGs, determine a networking device-host mapping representing which of the plurality of networking devices are connected to each of the one or more host devices, obtain one or more group-based policies associated with traffic sent from the first EPG to the second EPG, compute based on the host-EPG mapping, the networking device-host mapping and the one or more group-based policies, hardware pruning policies defining how to prune multi-destination traffic sent from the first EPG to the second EPG, and install the hardware pruning policies in one or more of the plurality of networking devices.

In another form, one or more non-transitory computer readable storage media encoded with instructions are provided. The instructions, when executed by a processor of a software defined network (SDN) controller, cause the processor to: determine at least first and second groups (EPGs) of an SDN associated with the SDN controller, wherein the SDN runs on a plurality of networking devices that interconnect a plurality of endpoints that are each attached to one or more host devices; determine a host-EPG mapping representing which of the one or more host devices have attached endpoints that are associated with each of the first and second EPGs; determine a networking device-host mapping representing which of the plurality of networking devices are connected to each of the one or more host devices; obtain one or more group-based policies associated with traffic sent from the first EPG to the second EPG; compute based on the host-EPG mapping, the networking device-host mapping and the one or more group-based policies, hardware pruning policies defining how to prune multi-destination traffic sent from the first EPG to the second EPG; and install the hardware pruning policies in one or more of the plurality of networking devices.

It is to be appreciated that the above examples are not mutually exclusive and may be combined in various arrangements. It is also to be appreciated that the above description is intended by way of example only. Various modifications and structural changes may be made therein without departing from the scope of the concepts described herein and within the scope and range of equivalents of the claims.

What is claimed is:

1. A method comprising:
at a software defined network (SDN) controller:
determining at least first and second groups (EPGs) of an SDN associated with the SDN controller, wherein the SDN runs on a plurality of networking devices that interconnect a plurality of endpoints that are each attached to one or more host devices;
determining a host-EPG mapping representing which of the one or more host devices have attached endpoints that are associated with each of the first and second EPGs by obtaining data from a virtualized environment controller via a dedicated control channel;
determining a networking device-host mapping representing which of the plurality of networking devices are connected to each of the one or more host devices;
obtaining one or more group-based policies associated with traffic sent from the first EPG to the second EPG;
computing based on the host-EPG mapping, the networking device-host mapping and the one or more group-based policies, hardware pruning policies defining how to prune multi-destination traffic sent from the first EPG to the second EPG so as to reduce the multi-destination traffic among the plurality of endpoints; and
installing the hardware pruning policies in one or more of the plurality of networking devices.

2. The method of claim 1, further comprising:
defining a virtual data structure for each of the first and second EPGs.

3. The method of claim 2, wherein the virtual data structure is a distributed virtual switch (DVS) port group.

4. The method of claim 1, wherein determining the networking device-host mapping is based on an out-of-band mechanism.

5. The method of claim 4, wherein the out-of-band mechanism includes:
obtaining, from two or more of the plurality of networking devices, data indicating the host devices that are connected to a corresponding networking device of the plurality of networking devices.

6. The method of claim 5, further comprising:
running a discovery protocol at each of the two or more of the plurality of networking devices to learn the host devices that are connected to the corresponding networking device.

7. An apparatus comprising:
a memory;
a network interface unit; and
a processor configured to:
determine at least first and second groups (EPGs) of a software defined network (SDN) associated with the apparatus, wherein the SDN runs on a plurality of networking devices that interconnect a plurality of endpoints that are each attached to one or more host devices,
determine a host-EPG mapping representing which of the one or more host devices have attached endpoints that are associated with each of the first and second EPGs by obtaining data from a virtualized environment controller via a dedicated control channel,
determine a networking device-host mapping representing which of the plurality of networking devices are connected to each of the one or more host devices,
obtain one or more group-based policies associated with traffic sent from the first EPG to the second EPG,
compute based on the host-EPG mapping, the networking device-host mapping and the one or more group-based policies, hardware pruning policies defining how to prune multi-destination traffic sent from the first EPG to the second EPG so as to reduce the multi-destination traffic among the plurality of endpoints, and
install the hardware pruning policies in one or more of the plurality of networking devices.

8. The apparatus of claim 7, wherein the processor is configured to:
define a virtual data structure for each of the first and second EPGs.

9. The apparatus of claim 8, wherein the virtual data structure is a distributed virtual switch (DVS) port group.

10. The apparatus of claim 7, wherein the processor is configured to use an out-of-band mechanism to determine the networking device-host mapping.

11. The apparatus of claim 10, wherein to use an out-of-band mechanism to determine the networking device-host mapping, the processor is configured to:
obtain, from two or more of the plurality of networking devices, data indicating the host devices that are connected to a corresponding networking device of the plurality of networking devices.

12. One or more non-transitory computer readable storage media encoded with instructions that, when executed by a processor of a software defined network (SDN) controller, cause the processor to:
determine at least first and second groups (EPGs) of an SDN associated with the SDN controller, wherein the SDN runs on a plurality of networking devices that interconnect a plurality of endpoints that are each attached to one or more host devices;
determine a host-EPG mapping representing which of the one or more host devices have attached endpoints that are associated with each of the first and second EPGs by obtaining data from a virtualized environment controller via a dedicated control channel;
determine a networking device-host mapping representing which of the plurality of networking devices are connected to each of the one or more host devices;
obtain one or more group-based policies associated with traffic sent from the first EPG to the second EPG;
compute based on the host-EPG mapping, the networking device-host mapping and the one or more group-based policies, hardware pruning policies defining how to prune multi-destination traffic sent from the first EPG to the second EPG so as to reduce the multi-destination traffic among the plurality of endpoints; and
install the hardware pruning policies in one or more of the plurality of networking devices.

13. The non-transitory computer readable storage media of claim 12, wherein the instructions operable to determine the networking device-host mapping comprise instructions operable to:

use an out-of-band mechanism to determine the networking device-host mapping.

14. The non-transitory computer readable storage media of claim 13, wherein the instructions operable to use an out-of-band mechanism to determine the networking device-host mapping comprise instructions operable to:
obtain from two or more of the plurality of networking devices, data indicating the host devices that are connected to a corresponding networking device of the plurality of networking devices.

15. The apparatus of claim 11, wherein the processor is further configured to:
run a discovery protocol at each of the two or more of the plurality of networking devices to learn the host devices that are connected to the corresponding networking device.

16. The non-transitory computer readable storage media of claim 12, wherein the instructions cause the processor to:
define a virtual data structure for each of the first and second EPGs.

17. The non-transitory computer readable storage media of claim 16, wherein the virtual data structure is a distributed virtual switch (DVS) port group.

18. The method of claim 2, further comprising:
for each of the first and second EPGs, associating the endpoints that are associated with the respective first and second EPGs with the virtual data structure.

19. The apparatus of claim 8, wherein the processor is configured to:
for each of the first and second EPGs, associate the endpoints that are associated with the respective first and second EPGs with the virtual data structure.

20. The non-transitory computer readable storage media of claim 16, wherein the instructions cause the processor to:
for each of the first and second EPGs, associate the endpoints that are associated with the respective first and second EPGs with the virtual data structure.

\* \* \* \* \*